United States Patent
Toksvig et al.

(10) Patent No.: US 7,996,622 B1
(45) Date of Patent: Aug. 9, 2011

(54) DETECTING UNUSED CACHE LINES

(75) Inventors: Michael J. M. Toksvig, Palo Alto, CA (US); Christopher D. S. Donham, San Mateo, CA (US)

(73) Assignee: NVIDIA Corporation, Santa Clara, CA (US)

( * ) Notice: Subject to any disclaimer, the term of this patent is extended or adjusted under 35 U.S.C. 154(b) by 725 days.

(21) Appl. No.: 11/890,821

(22) Filed: Aug. 7, 2007

(51) Int. Cl.
*G06F 12/00* (2006.01)

(52) U.S. Cl. ........................................ 711/133
(58) Field of Classification Search ........................ None
See application file for complete search history.

(56) References Cited

U.S. PATENT DOCUMENTS

| | | | |
|---|---|---|---|
| 5,764,228 A | 6/1998 | Baldwin | |
| 6,115,047 A | 9/2000 | Deering | |
| 6,483,516 B1 | 11/2002 | Tischler | |
| 6,556,200 B1 | 4/2003 | Pfister et al. | |
| 6,611,264 B1 | 8/2003 | Regan | |
| 6,622,213 B2 | 9/2003 | Tsai et al. | |
| 6,650,333 B1 * | 11/2003 | Baldwin | 345/552 |
| 6,795,078 B2 * | 9/2004 | Lavelle et al. | 345/535 |
| 7,015,913 B1 | 3/2006 | Lindholm et al. | |
| 7,079,156 B1 | 7/2006 | Hutchins et al. | |
| 7,106,336 B1 | 9/2006 | Hutchins | |
| 7,190,366 B2 | 3/2007 | Hutchins et al. | |
| 2003/0038810 A1 | 2/2003 | Emberling | |
| 2003/0103054 A1 | 6/2003 | Montrym et al. | |
| 2003/0151608 A1 | 8/2003 | Chung et al. | |
| 2003/0160796 A1 * | 8/2003 | Lavelle et al. | 345/557 |
| 2003/0164840 A1 | 9/2003 | O'Driscoll | |
| 2004/0119710 A1 | 6/2004 | Piazza et al. | |
| 2005/0052449 A1 | 3/2005 | Emberling | |
| 2005/0219253 A1 | 10/2005 | Piazza et al. | |
| 2005/0253873 A1 | 11/2005 | Hutchins et al. | |
| 2005/0275657 A1 | 12/2005 | Hutchins et al. | |
| 2006/0268005 A1 | 11/2006 | Hutchins et al. | |
| 2007/0008330 A1 | 1/2007 | Xu | |
| 2008/0007561 A1 | 1/2008 | Thompson | |

* cited by examiner

*Primary Examiner* — Brian R Peugh

(57) ABSTRACT

In the event of a cache miss, data is written from main memory to the cache. To select a cache line to write the data to, cache lines in the cache that are not referenced during a certain interval are identified. One of the identified cache lines is selected and the data can be written to that cache line.

18 Claims, 6 Drawing Sheets

DETECTING UNUSED CACHE LINES

FIELD OF THE INVENTION

Embodiments of the present invention generally relate to data processing.

BACKGROUND ART

In computer science, caches are used to reduce the number of accesses to main memory and to reduce the latency associated with data retrieval. Essentially, a cache is smaller and faster than main memory and can be used to store copies of frequently accessed data.

An address tag is associated with each cache line. Each address tag usually includes a portion (e.g., some number of the most significant bits) of a main memory address. A request for data will identify the main memory address where the data can be found. An address tag is derived from the main memory address and compared to the address tags in the cache. If there is a match (e.g., a cache hit), then the data can be fetched from the cache. If there is not a match (e.g., a cache miss), then the data is fetched from main memory and written to one of the cache lines.

A built-in delay (e.g., a first-in first-out buffer, or FIFO) is usually included between the stage in which the address tag is derived and the cache. In the event of a cache miss, it takes some amount of time to retrieve data from main memory and load it into one of the cache lines. Therefore, the request for data is delayed from reaching the cache until the fetch from main memory can occur, so that the data requested will be available when the request arrives at the cache.

However, care should be taken to not overwrite the current data in a cache line with new data until the last reference to the current data has been dispatched (referred to as a write-before-read hazard). One mechanism for avoiding the write-before-read hazard is to incorporate a second FIFO between main memory and the cache. When a request for data results in a cache miss, the second FIFO delays the writing of new data from main memory to the cache. This allows time for preceding requests to be cleared through the cache before any new data is introduced into the cache.

SUMMARY OF THE INVENTION

The use of a FIFO between main memory and cache is problematic for at least a couple of reasons. Although the second FIFO delays writing new data into the cache until preceding requests are cleared, the new data may overwrite data that is needed for a subsequent request. Another problem with the second FIFO is that it consumes area and power. In contemporary devices, particularly mobile or handheld devices, it is important to conserve area and power, so that these devices can be as small as possible and to prolong battery life. Accordingly, a method or system that can avoid the write-before-read hazard without a second FIFO between main memory and cache would be advantageous. Embodiments in accordance with the present invention provide these and other advantages.

As mentioned above, in the event of a cache miss, data is written from main memory to the cache, and there can be a delay between the request for the data and the writing of the data to the cache. According to embodiments of the present invention, in order to select a cache line to write the data to, cache lines in the cache that are not referenced during a certain interval—which may be referred to herein as the test interval—are identified. The length of the test interval corresponds to the length of the aforementioned delay. One of the unused cache lines is selected and the data can be written to that cache line, thus avoiding the write-before-read hazard.

In one embodiment, a particular packet is designated as a probe. The probe enters a FIFO that is upstream of the cache. The FIFO introduces a delay that compensates for the delay between a request for data and the writing of the data to the cache. In this embodiment, the test interval is defined as beginning when the probe enters the FIFO and as ending when the probe exits the FIFO. A respective bit or flag is associated with each cache line in the cache. At the beginning of the test interval, each of the bits is set to a first value. If a cache line is referenced during the test interval, then the value of its associated bit is set to a second value. Cache lines that are candidates to be written to can be identified based on the values of the bits when the test interval ends. For example, the candidates include those cache lines associated with bits that still have the first value.

In another embodiment, a count is initialized at the beginning of a test interval, and the test interval ends when the count reaches a specified number (e.g., zero). The initial value of the count may correspond to the number of packets in the FIFO, and the count can be decremented each time a packet is removed from the FIFO. A respective bit is associated with each cache line in the cache. At the beginning of the test interval, each of the bits is set to a first value. If a cache line is referenced during the test interval, then the value of its associated bit is set to a second value. Cache lines that are candidates to be written to can be identified based on the values of the bits when the test interval ends. For example, the candidates include those cache lines associated with bits that still have the first value.

In yet another embodiment, instead of designating a particular packet as a probe, the request for data itself is used to define the test interval—the test interval can be defined as beginning when the request is received and as ending when the request exits the FIFO. In this embodiment, two bits (a first bit and a second bit) are associated with each cache line. Presuming a cache hit, the request for data will include an address tag that indexes a particular cache line. At the beginning of the test interval, the first bit associated with that cache line is set to an initial value (e.g., 0 or 1) and the second bit associated with that cache line is set to an initial value (e.g., 0 or 1). The second bit is set to its opposite value (e.g., 1 or 0) when the test interval ends. If the cache line is referenced during the test interval (e.g., if a second request for data that also references the cache line is received while the second bit has its initial value), then the value of the first bit is set to its opposite value (e.g., 1 or 0). In essence, the value of the second bit indicates whether or not the cache line is being probed, while the value of the first bit indicates whether or not the cache line is a candidate to be written to. If the cache line is being probed (e.g., if the second bit is set to its initial value), then the value of its associated first bit can be changed from its initial value if the cache line is referenced by another request for data during the test interval. If, when the test interval ends, the first bit has a value other than its initial value, then the cache line is not a candidate to be written to.

In summary, embodiments according to the present invention provide mechanisms that efficiently and effectively identify unused cache lines to avoid the write-before-read hazard. These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE INVENTION

Figure 1:
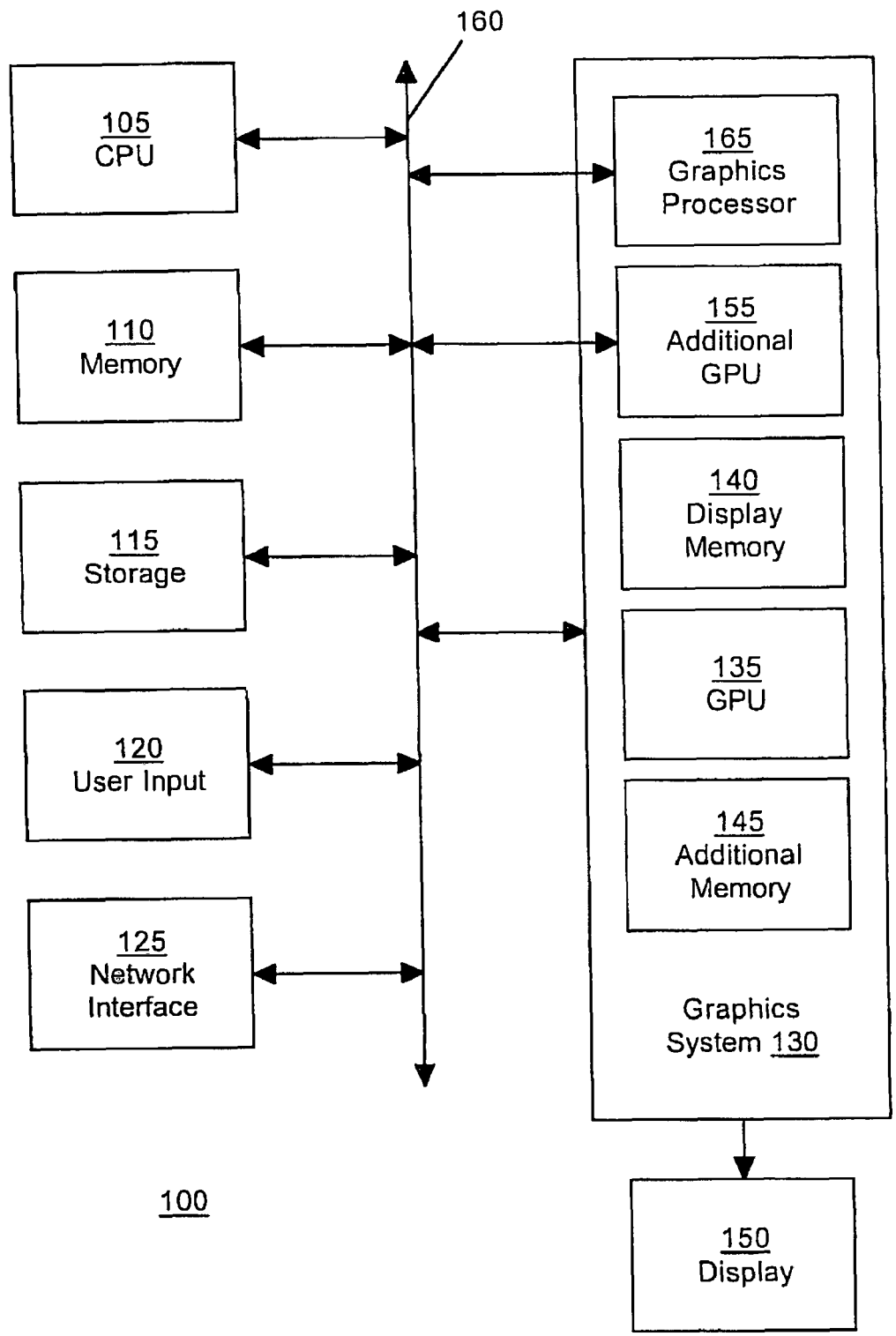
FIG. 1 is a block diagram of an exemplary computer system upon which embodiments in accordance with the present invention can be implemented.

Reference will now be made in detail to the various embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "identifying," "requesting," "selecting," "designating," "setting," "inserting," "initiating," "receiving," "reading," "writing," "passing," "allocating," "changing," "checking" or the like, refer to actions and processes (e.g., the flowcharts of FIGS. 5, 6, 7 and 8) of a computer system or similar electronic computing device or processor (e.g., system 100 of FIG. 1). The computer system or similar electronic computing device manipulates and transforms data represented as physical (electronic) quantities within the computer system memories, registers or other such information storage, transmission or display devices.

FIG. 1 is a block diagram of an example of a computer system 100, such as a personal computer (desktop, laptop, notebook), video game console, personal digital assistant, cellular phone, computer-based simulator, digital camera, or other digital device, on which embodiments of the present invention can be implemented.

In the example of FIG. 1, computer system 100 includes a central processing unit (CPU) 105 for running software applications and optionally an operating system. Memory 110 stores applications and data for use by the CPU 105. Storage 115 provides non-volatile storage for applications and data and may include fixed disk drives, removable disk drives, flash memory devices, and CD-ROM, DVD-ROM or other optical storage devices. User input 120 includes devices that communicate user inputs from one or more users to the computer system 100 and may include keyboards, mice, joysticks, touch screens, and/or microphones. Network interface 125 allows computer system 100 to communicate with other computer systems via an electronic communications network, including wired and/or wireless communication. The components of computer system 100, including CPU 105, memory 110, data storage 115, user input devices 120, and network interface 125, are connected via one or more data buses 160.

In the present embodiment, graphics system 130 is connected with data bus 160 and the components of the computer system 100. The graphics system 130 may be integrated with the computer system motherboard or on a separate circuit board fixedly or removably connected with the computer system. The graphics system 130 may include a graphics processing unit (GPU) 135 and graphics memory. Graphics memory may include a display memory 140 (e.g., a framebuffer) used for storing pixel data for each pixel of an output image. In another embodiment, display memory 140 and/or additional memory 145 are part of memory 110 and are shared with the CPU 105. Alternatively, display memory 140 and/or additional memory 145 can be one or more separate memories provided for the exclusive use of the graphics system 130.

Pixel data can be provided to display memory (e.g., framebuffer) 140 directly from the CPU 105. Alternatively, CPU 105 can provide the GPU 135 with data and/or commands defining the desired output images, from which the GPU 135 can generate the pixel data of one or more output images. The data and/or commands defining the desired output images can be stored in additional memory 145. In one embodiment, the GPU 135 can generate pixel data for output images from rendering commands and data defining the geometry, lighting, shading, texturing, motion, and/or camera parameters for a scene to be rendered.

The graphics system 130 periodically outputs pixel data for an image from display memory 140 for display on display device 150. Display device 150 is any device capable of displaying visual information in response to a signal from the computer system 100. Computer system 100 can provide the display device 150 with an analog or digital signal.

In another embodiment, graphics processing system 130 includes one or more additional GPUs 155, similar to GPU 135. In yet another embodiment, graphics processing system 130 includes a graphics coprocessor 165. Graphics coprocessor 165 and additional GPU 155 are adapted to operate in parallel with GPU 135 or in place of GPU 135. Additional GPU 155 generates pixel data for output images from rendering commands, similar to GPU 135. Additional GPU 155 can operate in conjunction with GPU 135 to simultaneously generate pixel data for different portions of an output image, or to simultaneously generate pixel data for different output images. In one embodiment, graphics coprocessor 165 performs rendering related tasks such as geometry transformation, shader computations, and backface culling operations for GPU 135 and/or additional GPUs 155.

Additional GPU 155 can be located on the same circuit board as GPU 135, sharing a connection with GPU 135 to data bus 160, or additional GPU 155 can be located on an additional circuit board separately connected with data bus 160. Additional GPU 155 can also be integrated into the same module or chip package as GPU 135. Additional GPU 155 can have its own display and additional memory, similar to display memory (e.g., framebuffer) 140 and additional memory 145, or can share memories 140 and 145 with GPU 135. In one embodiment, the graphics coprocessor 165 is integrated with the computer system chipset (not shown), such as the Northbridge or Southbridge chip used to control the data bus 160.

Figure 2:
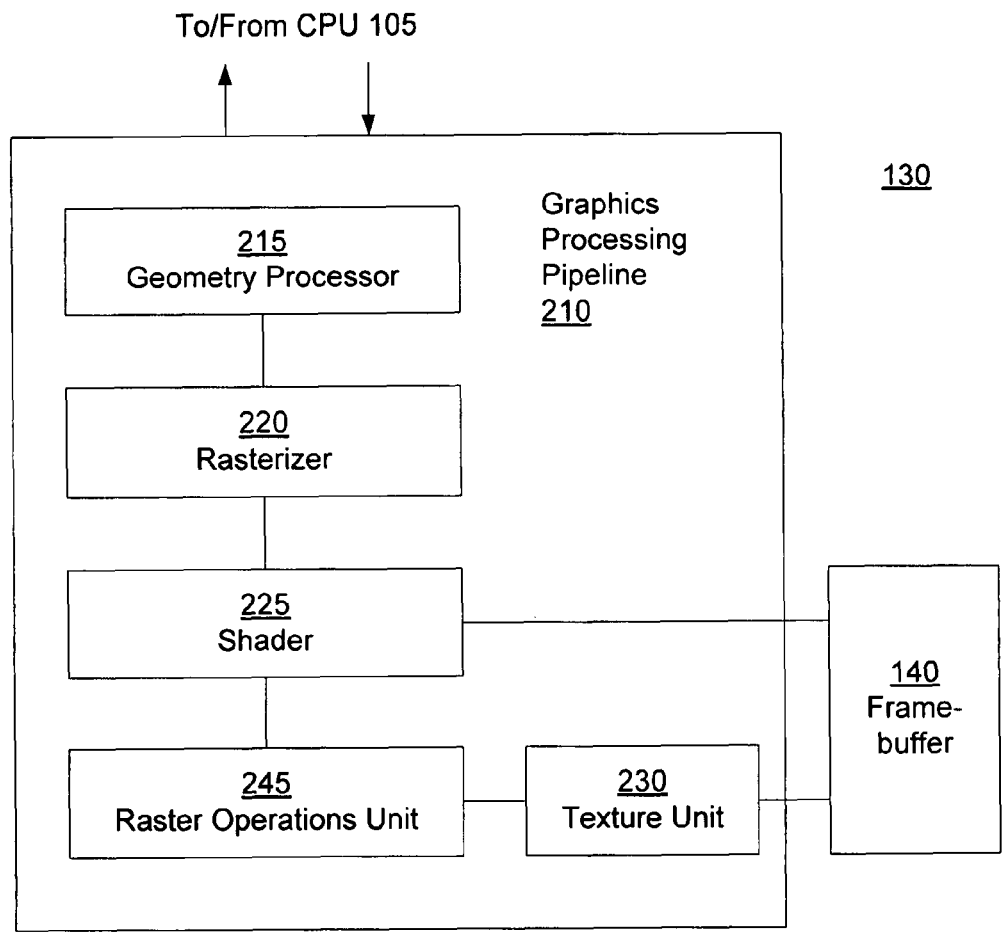
FIG. 2 is a block diagram of an example computer graphics system upon which embodiments in accordance with the present invention can be implemented.

FIG. 2 illustrates an example of a graphics system 130 in accordance with one embodiment of the present invention. A graphics processing pipeline 210 receives commands for generating graphical images from CPU 105. There may be more than one graphics processing pipeline, operating in parallel. Graphics processing pipeline 210 may be disposed on a GPU (e.g., GPU 135 or GPU 155 of FIG. 1) and includes, for example, a geometry processor 215, a rasterizer 220, a shader unit 225 and a texture unit 230, and a raster operations (ROP) unit 245. Framebuffer 140 (e.g., the display memory of FIG. 1) may include one or more buffers (not shown in FIG. 2), such as a stencil buffer, an anti-aliasing buffer, a depth buffer, and/or an alpha buffer.

In general, geometry processor 215 generates primitives from vertex data. In one embodiment, geometry processor 215 receives rendering commands and data used to define the desired rendered image or images, including geometry, lighting, shading, texturing, motion, and/or camera parameters for a scene. The rendering data may include one or more vertices defining geometric primitives. Each vertex has a position that is typically expressed in a two-dimensional or three-dimensional coordinate system. In addition to a position, various attributes are associated with each vertex. In general, attributes of a vertex may include any property that is specified on a per-vertex basis. In one embodiment, the vertex attributes include scalar or vector attributes used to determine qualities such as the color, transparency, lighting, shading, and animation of the vertex and its associated geometric primitives.

In one embodiment, geometry processor 215 executes one or more vertex programs on each vertex to create a transformed vertex. The geometry processor 215 is programmable, and rendering applications can specify the vertex program to be used for any given set of vertices. In one embodiment, the vertex program transforms a vertex from a three-dimensional world coordinate system to a two-dimensional screen coordinate system. More complicated vertex programs can be used to implement a variety of visual effects, including lighting and shading, procedural geometry, and animation operations. In one embodiment, geometry processor 215 also culls or discards geometric primitives and/or portions thereof that are outside the field of view or otherwise unseen in the rendered image, and also may assemble one or more vertices into a geometric primitive, such as a triangle or quadrilateral.

In general, rasterizer 220 rasterizes primitives. In one embodiment, rasterizer 220 converts each geometric primitive into one or more pixel fragments. A pixel fragment defines a set of one or more pixels to be potentially displayed in the rendered image. In one implementation, a fragment comprises a two-pixel-by-two-pixel (2×2) array, referred to herein as a quad. In alternate implementations, fragments can include any other arrangement of fragments and pixels. Each fragment coming out of the rasterizer includes information defining the potential coverage of the associated geometric primitive in the rendered image, for example image coordinates of the pixels associated with the fragment and coverage of the associated geometric primitive at that pixel location.

In one embodiment, shader 225 uses the position information generated by rasterizer 220 and associated with each pixel fragment, as well as per-vertex and per-geometric primitive attributes, to determine the output values (for example, color and depth) of each fragment. A shader program is executed on each pixel fragment to determine an output color value for a pixel. In the present embodiment, texture unit 230 fetches a texture (specifically, a texel), and maps the texture to a pixel location in an image.

The shaded fragments are then output to the raster operations unit 245, along with attributes such as fragment color, depth, and stencil values. The raster operations unit 245 integrates the fragments that are output from the shader 225 with the portion of the rendered image already stored in the framebuffer 250. Fragments can be blended or masked with pixels previously written to the rendered image in the framebuffer 250. Raster operations can also include anti-aliasing and discarding of occluded primitives. The combination of each incoming fragment and any previously stored pixel values in the framebuffer 250 is then output to the framebuffer as part of the rendered image.

Figure 3:
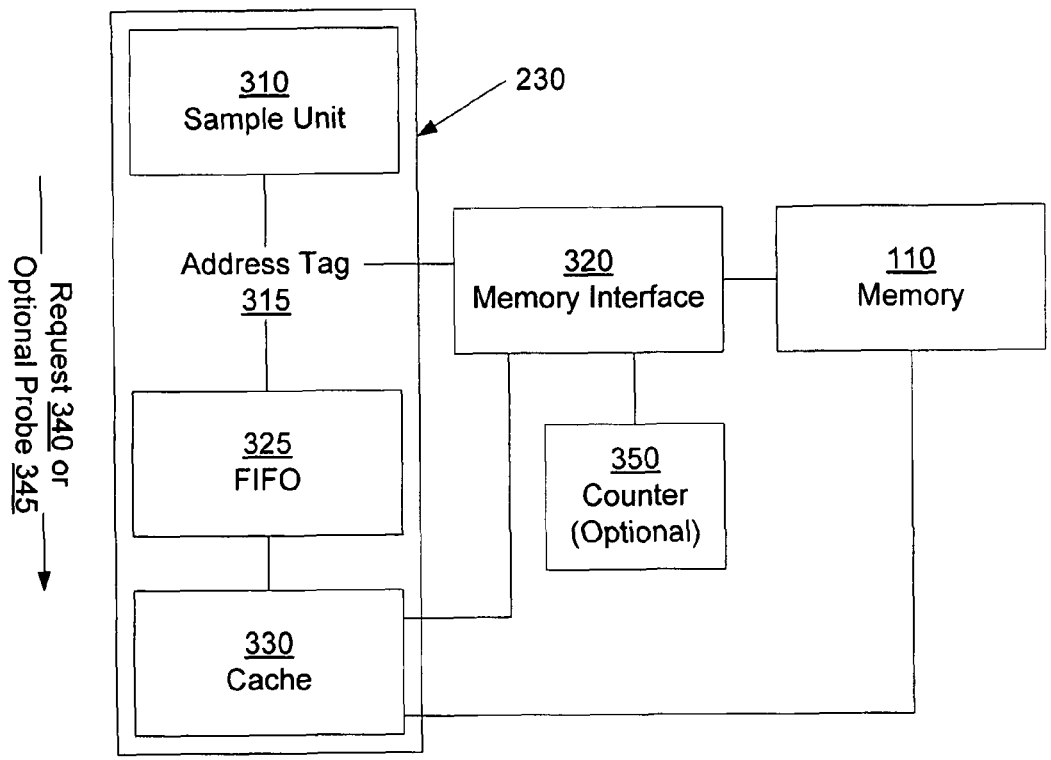
FIG. 3 is a block diagram of an example of a texture unit in an embodiment according to the present invention.

FIG. 3 is an example of a texture unit 230 in an embodiment according to the present invention. In the example of FIG. 3, texture unit 230 includes a sample unit 310, a FIFO 325 and a cache 330, and is coupled to a memory interface 320 that in turn is coupled to memory 110. Texture unit 230 may include functional blocks in addition to those shown in FIG. 3. The functionality provided by the memory interface may be provided by another element of the texture unit 230 or, more generally, another element of system 100 (FIG. 1).

In the present embodiment, sample unit 310 reads texture requests including state information such as level of detail (LOD). A texture request can provide a memory address for data associated with the request, or sample unit 310 can derive a memory address from the state information contained in the request in a known manner. An address translation may be performed to translate the derived memory address into a physical memory address in memory 110. An address tag 315 can then be formed from the memory address.

Cache 330 is a cache memory for storing previously accessed data. Each entry or line of the cache is indexed by a respective address tag. Generally, an address tag includes the higher order (most significant) bits of the memory address in memory 110 that is the source of the data stored in the cache line indexed by the address tag.

In the example of FIG. 3, memory interface 320 compares the address tag 315 to the address tags in cache 330. If the address tag 315 matches an address tag in cache 330 (a cache hit), then the data stored in the cache line that is indexed by address tag 315 can be output from texture unit 230. If the address tag 315 does not match an address tag in cache 330 (a cache miss), then the aforementioned memory address can be used to fetch the appropriate data from memory 110, and in turn that data can be written to one of the lines in cache 330 and subsequently output from texture unit 230. In order to avoid a write-before-read hazard, care is taken to select an unused cache line to receive the new data. The detection of unused cache lines is described more fully in conjunction with FIGS. 5, 6, 7 and 8, below.

In the example of FIG. 3, FIFO 325 is located upstream of cache 330, such that each request 340 for data from sample unit 310 will pass through FIFO 325 regardless of whether the request results in a cache miss or a cache hit. In the event of a cache miss, FIFO 325 compensates for the delay inherent in fetching data from memory 110 to cache 330. In the event of a cache hit, the FIFO 325 maintains the order of the requests, so that requests that result in cache hits do not move ahead of requests that result in cache misses. The FIFO 325 contains some number of stages or entries, where the number of stages is by design commensurate with the amount of delay associated with responding to cache misses. In general, it takes some number of clock cycles for a request 340 to pass through FIFO 325, where that number of clock cycles is also by design commensurate with the amount of delay associated with responding to cache misses. In one embodiment, the requests queued in FIFO 325 advance one stage per clock cycle.

In one embodiment, a counter 350 is coupled to the memory interface 320. The counter 350 is described further in conjunction with FIG. 7, below.

Figure 4:
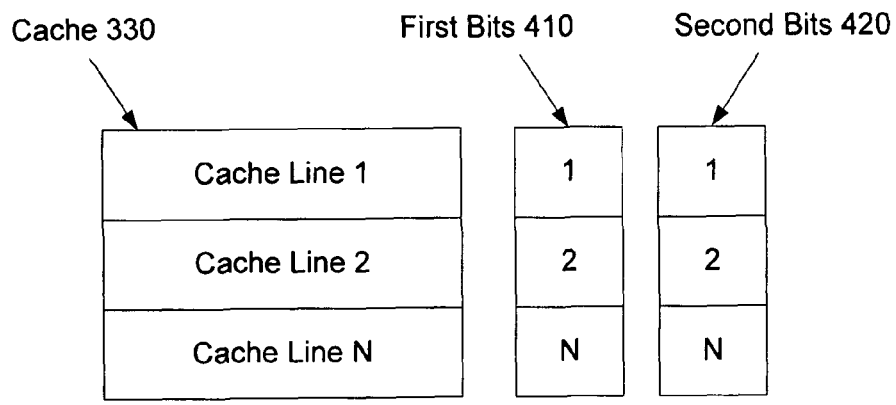
FIG. 4 illustrates a cache and associated bits in embodiments according to the present invention.

FIG. 4 illustrates cache 330 in embodiments according to the present invention. In the example of FIG. 4, cache 330 includes a number of cache lines 1, 2, . . . , N. In one embodiment, a first bit 410 is associated with each cache line. In another embodiment, both a first bit 410 and a second bit 420 are associated with each cache line. The first bits 410 and second bits 420 may be stored in cache 330 or stored separately from cache 330.

In one embodiment, a first bit 410 is used to indicate whether or not a respective cache line has been referenced in a request for data at any time during an interval (which may be referred to as a test interval) that corresponds in length to the length of the delay associated with responding to cache misses. In such an embodiment, the first bits 410 are set to a binary first value (e.g., to 1) at the beginning of the test interval and are changed to a binary second value (e.g., to 0) if their respective cache line is referenced (e.g., there is a cache hit) during the test interval. Accordingly, the first bits 410 associated with cache lines that are not referenced during the test interval will have their initial value (e.g., 1)—these cache lines can be characterized as unused cache lines and therefore are candidates to be written to in the event of a cache miss. Those cache lines associated with first bits 410 that have the second value (e.g., 0) are characterized as used cache lines and are not identified as candidates to be written to, at least until the results from a subsequent test interval indicate otherwise. In essence, the first bits 410 provide a mask that can be used to identify which of the cache lines are candidates to be written to. Additional details are provided in conjunction with FIGS. 6 and 7, below.

Continuing with reference to FIG. 4, in another embodiment, instead of a one-to-one mapping of first bits 410 to cache lines, a single one of the first bits 410 may be associated with a group of cache lines. In this embodiment, if any of the cache lines in the group are referenced during the test interval, then all of the cache lines in the group are characterized as used cache lines.

In yet another embodiment, a second bit 420 is used to indicate that a respective cache line is being tested or probed, and is used in combination with the first bit 410 associated with that cache line to identify whether or not the cache line has been referenced in a request for data at any time during the test interval. In other words, for each cache line to be tested or probed during a test interval, a respective second bit 420 can be set to a binary first value (e.g., to 1) to indicate the beginning of a test interval and subsequently reset to a binary second value (e.g., to 0) to indicate the end of the test interval. During the test interval, the first bit 410 associated with the cache line being tested is set to one value or another, in order to indicate whether or not the cache line has been referenced during the test interval in a manner similar to that described above. Additional details are provided in conjunction with FIG. 8, below.

The last of the embodiments just described utilizes two bits per cache line instead of one bit per cache line, as described in the first of those embodiments. As will be seen, when one bit per cache line is used, a probe packet 345 (which is different from a request) may be used to test or probe a cache line or group of cache lines. However, when two bits per cache line are used, a request can be used to probe a cache line (that is, a probe packet is not required).

FIGS. 5, 6, 7 and 8 are, respectively, flowcharts 500, 600, 700 and 800 (500-800) of methods for detecting unused cache lines in various embodiments according to the present invention. Although specific steps are disclosed in flowcharts 500-800, such steps are exemplary. That is, embodiments of the present invention are well-suited to performing various other steps or variations of the steps recited in flowcharts 500-800. The steps in flowcharts 500-800 may be performed in an order different than presented and that the steps in flowcharts 500-800 are not necessarily performed in the sequence illustrated. Furthermore, the features of the various embodiments described above can be used alone or in combination.

In one embodiment, the methods of flowcharts 500-800 are performed by graphics system 130 of FIG. 2, and more specifically, in texture unit 230 of FIG. 3. However, embodiments in accordance with the present invention are not so limited. In general, embodiments in accordance with the present invention can be implemented in virtually any application that needs to detect unused cache lines.

Figure 5:
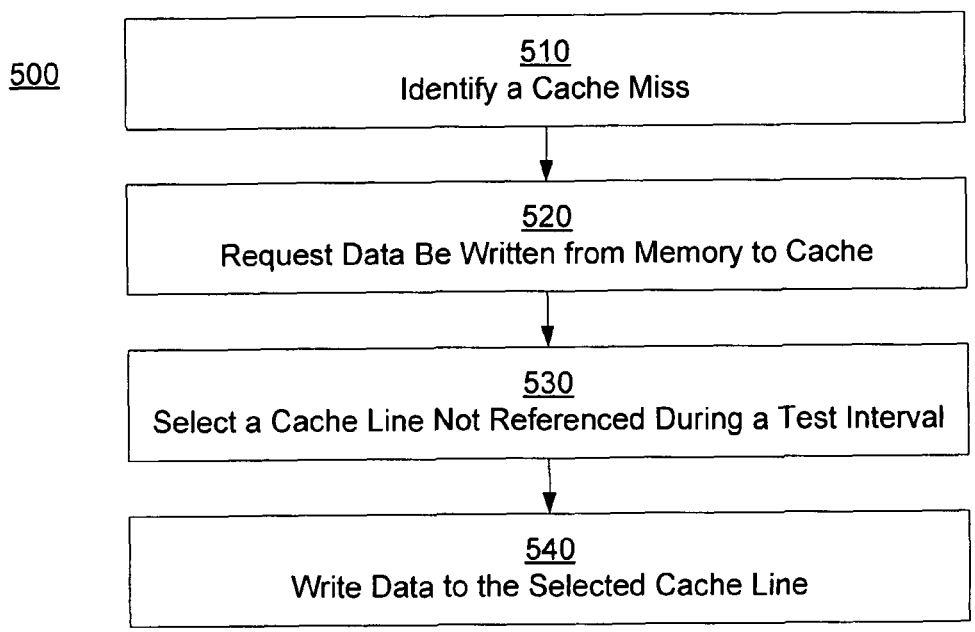
FIGS. 5, 6, 7 and 8 are flowcharts of methods for detecting unused cache lines in various embodiments according to the present invention.

In block 510 of FIG. 5, a cache miss is identified.

In block 520, with reference also to FIG. 3, in response to the cache miss, a request is dispatched to write data from main memory (e.g., memory 110) to cache 330. As noted above, there can be a delay between the request for the data and the writing of the data to the cache.

In block 530 of FIG. 5, to select a cache line to write the data to, cache lines in the cache that are not referenced during a certain interval—previously referred to herein as the test interval—are identified, and one of the unused cache lines is selected. The length of the test interval corresponds to the length of the aforementioned delay. Additional details with regard to the selection of a cache line are provided in conjunction with FIGS. 6, 7 and 8, below.

In block 540 of FIG. 5, data can be written to the selected unused cache line, thereby avoiding the write-before-read hazard.

Figure 6:
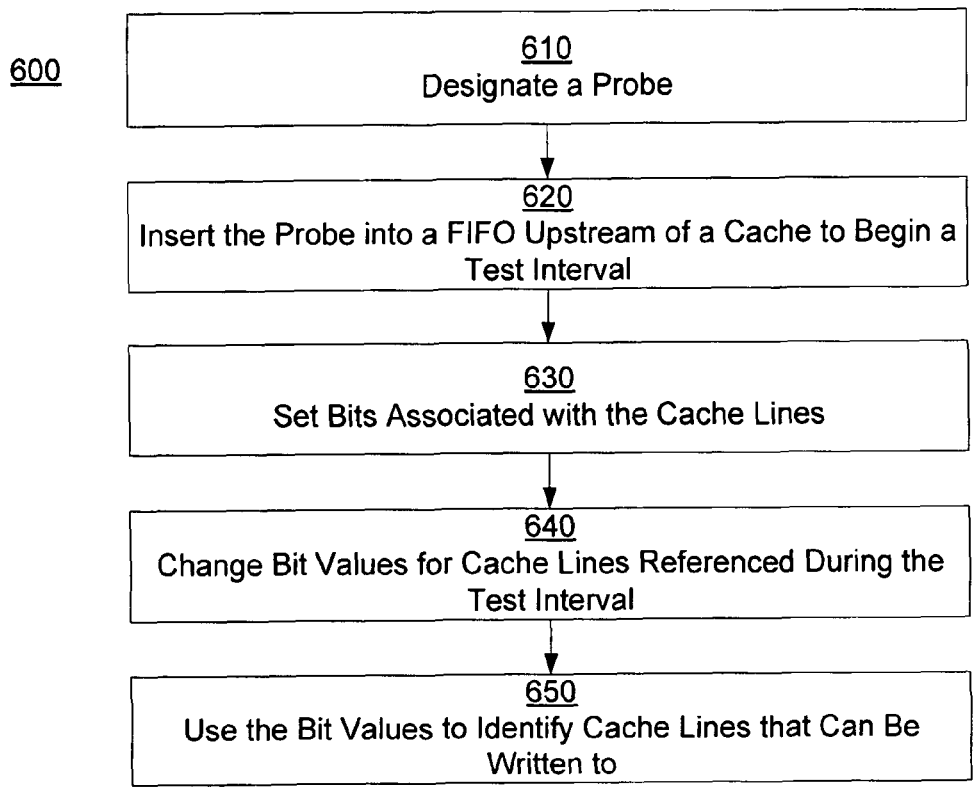

With reference now to FIG. 6 and also to FIG. 3, an embodiment is described in which a probe packet 345 is used to test or probe a cache line. In block 610, a particular packet is designated or created as a probe. Mechanisms for creating or identifying probes are known in the art. For example, a packet similar in format to a texture request, but containing a particular or illegal bit code or instruction, can be used to distinguish a probe packet from a more conventional request.

In block 620, the probe 345 enters FIFO 325. In this embodiment, the test interval is defined as beginning when the probe 345 enters the FIFO 325 and as ending when the probe exits the FIFO.

In block 630, a bit 410 (FIG. 4) is associated with each cache line in the cache 330. At the beginning of the test interval, each of the bits 410 is set to a first value (e.g., to 1). In one embodiment, the memory controller 320 (FIG. 3) sets the values of the bits 410.

In block 640 of FIG. 6, if a cache line is referenced during the test interval, then the value of its associated bit 410 is set to a second value (e.g., to 0). Once the bit 410 for a cache line is changed to the second value, subsequent references to that cache line during the same test interval do not affect the value of the first bit 410.

In block 650, cache lines that are candidates to be written to can be identified based on the values of the bits 410 when the test interval ends. For example, the candidates include those cache lines associated with bits that still have the first value (e.g., 1), which indicates that those cache lines were not referenced during the test interval.

In the present embodiment, probes can be launched in series (e.g., once one probe exits FIFO 325, another probe can be inserted into the FIFO, either immediately thereafter or after some period of time) or in parallel (e.g., a second probe can be inserted into FIFO 325 before a preceding probe has exited the FIFO). Also, as described above, at any point in time it is possible to use the values of the first bits 410 to identify how many of the cache lines are characterized as unused (or used). Accordingly, a probe can be launched if, for example, the number of unused cache lines falls below a defined threshold.

Figure 7:
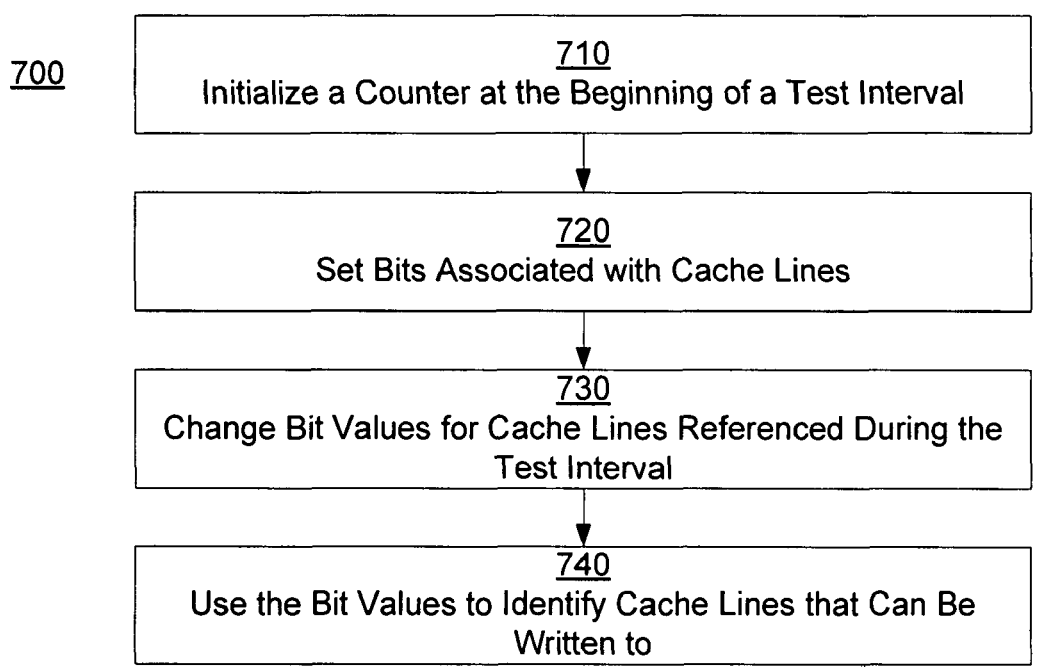

With reference now to FIG. 7 and also to FIG. 3, an embodiment is described in which a counter 350 is used to test or probe a cache line. In block 710, a count is initialized. In this embodiment, the test interval is defined as beginning when the count begins and as ending when the count reaches zero. More specifically, when the test interval begins, the counter is set to the number of packets in the FIFO 325. The counter is decremented each time a packet is removed from the FIFO 325. Eventually the counter will reach zero, meaning that none of the packets placed in the FIFO before the probe remain in the FIFO. Accordingly, the values of the bits 410 that will be accumulated during the test interval (as described in blocks 720, 730 and 740 below) will reflect the status of the various cache lines in the FIFO at the end of the test interval.

In block 720, a bit 410 (FIG. 4) is associated with each cache line in the cache 330. At the beginning of the test interval, each of the bits 410 is set to a first value (e.g., to 1). In one embodiment, the memory controller 320 (FIG. 3) sets the values of the bits 410.

In block 730 of FIG. 7, if a cache line is referenced during the test interval, then the value of its associated bit 410 is set to a second value (e.g., to 0). Once the bit 410 for a cache line is changed to the second value, subsequent references to that cache line during the same test interval do not affect the value of the first bit 410.

In block 740, cache lines that are candidates to be written to can be identified based on the values of the bits 410 when the test interval ends. For example, the candidates include those cache lines associated with bits that still have the first value (e.g., 1), which indicates that those cache lines were not referenced during the test interval. Once one test interval ends, another can begin, either immediately or after a period of time.

In the present embodiment, multiple counters can be used, such that test intervals are implemented in parallel.

Also, as described above, at any point in time it is possible to use the values of the first bits 410 to identify how many of the cache lines are characterized as unused (or used). Accordingly, a count can be initiated if, for example, the number of unused cache lines falls below a defined threshold.

In the embodiments above, the first bit 410 (FIG. 4) is described as being flipped from its initial value to a second value if its associated cache line is referenced during a test interval (where the second value indicates that the cache line is not a candidate to be written to). The value of the first bit 410 can also be set to the second value if a new address tag is allocated to its associated cache line (independent of whether a test or probe is underway). For example, based on the result of a prior test or probe, a cache line may be identified as a candidate to be written to. Consequently, new data may be written to the cache line, and a new address tag may be associated with the cache line. Accordingly, the cache line may be identified as a used cache line, at least until the results of another test or probe indicate otherwise.

Figure 8:
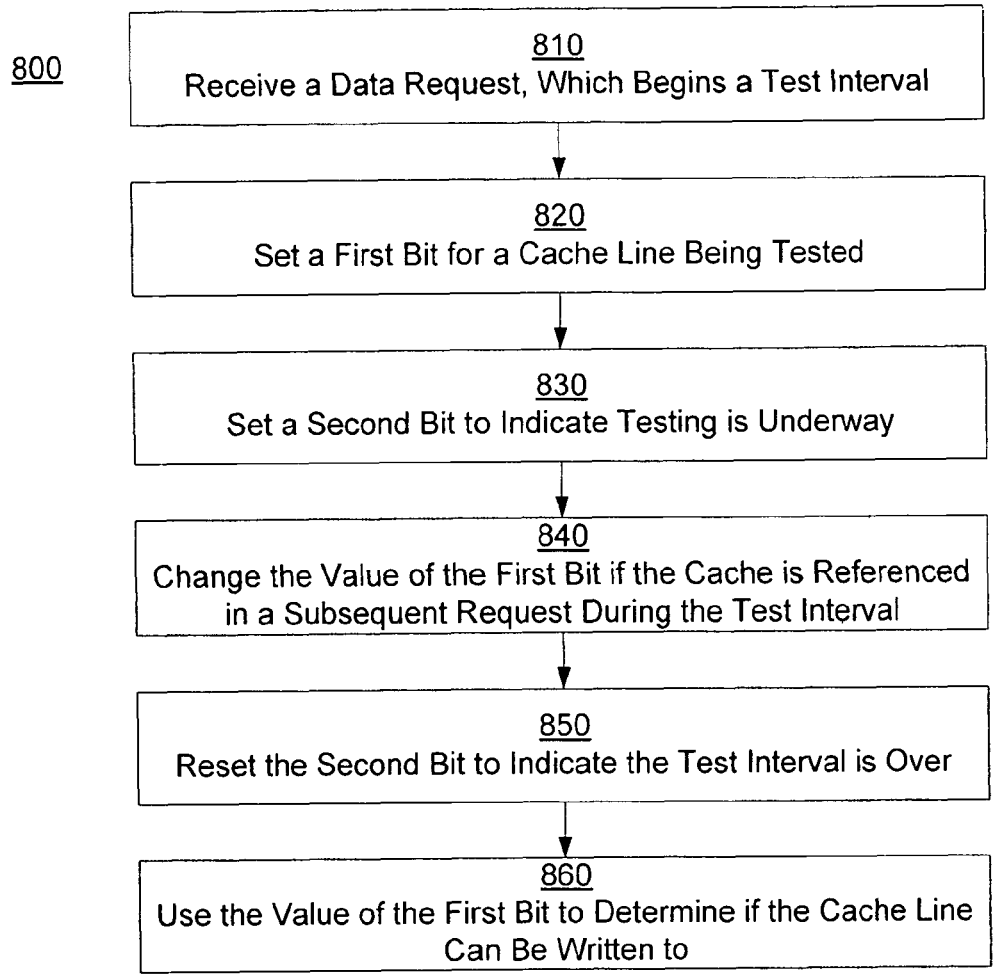

With reference now to FIG. 8 and also to FIGS. 3 and 4, an embodiment is described in which a request 340 is used to probe or test a cache line instead of a probe packet 345. In this embodiment, the request for data is used to define the test interval, and two bits (a first bit 410 and a second bit 420) are associated with each cache line in cache 330. In one embodiment, the test interval is defined as beginning when the request is received and as ending when the request exits the FIFO 325. Alternatively, the beginning of the test interval can be defined as coincident with the request entering the FIFO 325. Generally speaking, the test interval begins in response to the request.

In block 810, a request for data is received. The cache line to be probed is identified by an address tag 315 associated with the request (e.g., there is a cache hit).

In block 820, at the beginning of the test interval, the first bit 410 associated with the cache line being probed is set to an initial value (e.g., to 1) by memory controller 320 of FIG. 3, for example.

In block 830, to indicate the test interval has begun (e.g., to indicate that the cache line of interest is in the probe state), the second bit 420 associated with the cache line being probed is set to an initial value (e.g., to 1, although the value of the second bit can be different from the value of the first bit). In one embodiment, the memory controller 320 (FIG. 3) sets the values of the bits 420.

In block 840, if the cache line being probed is referenced during the test interval, then the value of the first bit 410 is set to its opposite value (e.g., to 0). That is, if there is a second request for data while the second bit 420 has its initial value (e.g., 1), where that second request also contains the address tag 315 for the cache line of interest, then the value of the first bit 410 is changed. Subsequent requests that reference the cache line of interest during the same test interval do not affect the value of the first bit 410.

In block 850, the second bit 420 is set to its opposite value (e.g., to 0) when the test interval ends (when the request exits FIFO 325).

In block 860, the value of the first bit 410 can be used to determine whether or not the cache line of interest is a candidate to be written to, as described previously herein. In essence, the value of the second bit 420 indicates whether or not its associated cache line is being probed, while the value of the first bit 410 indicates whether or not its associated cache line is a candidate to be written to. If, when the test interval ends, the first bit 410 has a value other than its initial value, then the cache line is not a candidate to be written to.

Multiple requests can be in transit through FIFO 325 at the same time, and so multiple cache lines can be probed in parallel.

Because a request can be used as a probe, a cache line can be characterized as used or unused more quickly relative to an approach that uses a distinct probe packet. In essence, a request that references a cache line is treated as the last request for that cache line unless demonstrated otherwise (by the occurrence of a second request for the cache line during the test interval). If during the test interval there is not another request for the cache line being probed, then that cache line is considered unused once the request exits the FIFO 325.

In another embodiment, the first bit 410 and second bit 420 are used in a different manner to identify cache lines that can be written to. In such an embodiment, FIFO 325 is divided into, for example, three zones that are designated as zones 0, 1 and 2. At some given point in time, zone 2 is designated as corresponding to the top (input) of the FIFO, zone 1 is designated as corresponding to the bottom (output) of the FIFO, with zone 0 in between zones 2 and 1. If a cache line is referenced by a request 340 (FIG. 3) entering the FIFO 325, its associated two-bit value is set to a value of two (10 in binary) to indicate that it has been referenced in zone 2 (the top-most zone at the current point in time). Because at this point in time zone 1 is at the bottom of FIFO 325, requests that are removed from the FIFO are in zone 1; the two-bit values corresponding to the cache lines associated with zone 1 requests have been previously set to a value of one (01 in binary). Eventually, all requests in zone 1 are removed from the FIFO 325, meaning that all cache lines that still have a two-bit value of one (01) are unused (note that, if a cache line that was associated with a zone 1 request and had a two-bit value of one was then referenced by a zone 2 request, for example, its two-bit value would be changed from one to two). Accordingly, the two-bit values for those cache lines that still have a two-bit value of one are reset to a value of three (11 in binary) to indicate that those cache lines are unused, and zone 1 is then designated the top-most zone, with zone 0 being designated the bottom-most zone and zone 2 in between zones 1 and 0. This process is repeated, with each zone being recycled to the top of the FIFO 325 after it is emptied at the bottom of the FIFO.

With one bit per cache line (e.g., as described in conjunction with FIG. 6 above), an unused cache line can be detected within a length of time that is equivalent to the depth of the FIFO 325. With two bits per cache line as just described, an unused cache line can be detected within a length of time that is equivalent to one-third the depth of the FIFO. In other embodiments, the FIFO 325 can be divided into seven zones and three bits per cache line can be used (meaning that an unused cache line can be detected within a length of time that is equivalent to one-seventh the depth of the FIFO), or the FIFO can be divided into 15 zones and four bits per cache line can be used (meaning an unused cache line can be detected within a length of time that is equivalent to one-fifteenth the depth of the FIFO), and so on.

In summary, according to embodiments described herein, unused cache lines are effectively and efficiently identified and write-before-read hazards are avoided. Accordingly, less power and less area are consumed relative to conventional solutions. As a result, devices can be made smaller and batteries can be recharged less frequently.

Embodiments of the present invention are thus described. While the present invention has been described in particular embodiments, it should be appreciated that the present invention should not be construed as limited by such embodiments, but rather construed according to the below claims.

What is claimed is:

1. A method for detecting unused cache lines, said method comprising:
   in response to a cache miss, requesting that data be written from main memory to a cache;
   selecting a cache line in said cache to write said data to, wherein said selecting comprises i) identifying cache lines in said cache that are not referenced during a test interval, wherein bit values associated with said cache lines that are not referenced during said test interval have a binary first value at the beginning of said test interval and remain set to said first value at the end of said test interval, and ii) selecting said cache line, wherein said cache line is one of said cache lines not referenced during said test interval;
   allocating to said cache line a new address tag that replaces an existing address tag associated with said cache line;
   in response to said allocating, changing a bit associated with said cache line from said first value to a binary second value, wherein if said bit has said second value then said cache line is not a candidate to be written to; and
   writing said data to said cache line that is selected.

2. The method of claim 1 wherein said identifying cache lines further comprises:
   designating a particular packet as a probe;
   inserting said probe into a first-in first-out buffer (FIFO) that is coupled upstream of said cache, wherein said test interval begins with said inserting and ends when said probe exits said FIFO;
   concurrent with said inserting, setting a plurality of bits associated with said cache lines to said first value, wherein each of said cache lines is associated with a respective one of said bits;
   if a cache line is referenced during said test interval, setting a value of a respective bit in said plurality of bits to said second value; and
   identifying which of said caches lines are candidates to be written to based on values of said plurality of bits when said test interval ends, wherein said candidates comprise cache lines associated with bits having said first value.

3. The method of claim 1 wherein said identifying cache lines further comprises:
   initiating a count, wherein said test interval begins with said initiating and ends when said count reaches a specified number;
   concurrent with said initiating, setting a plurality of bits associated with said cache lines to said first value, wherein each of said cache lines is associated with a respective one of said bits;
   if a cache line is referenced during said test interval, setting a value of a respective bit in said plurality of bits to said second value; and
   identifying which of said cache lines are candidates to be written to based on values of said plurality of bits when said test interval ends, wherein said candidates comprise cache lines associated with bits having said first value.

4. The method of claim 1 further comprising:
   receiving a request comprising a reference to said cache line, wherein said test interval begins with said receiving;
   in response to said request, setting a first bit associated with said cache line to said first value and setting a second bit associated with said cache line to said second value;

passing said request through a first-in first-out buffer (FIFO) that is coupled upstream of said cache, wherein said test interval ends when said request exits said FIFO and wherein said second bit is set to a binary third value when said test interval ends; and setting said first bit to a binary fourth value if a second request comprising a reference to said cache line is received while said second bit is set to said second value, wherein if said first bit has said fourth value when said test interval ends then said cache line is not a candidate to be written to.

5. The method of claim 1 further comprising:
receiving a plurality of requests comprising references to a plurality of cache lines, wherein a plurality of bits is associated with each of said cache lines and wherein said test interval begins when the first request of said plurality of requests is received;
in response to each of said requests, setting a respective said plurality of bits to said first value;
passing said plurality of requests through a first-in first-out buffer (FIFO) that is coupled upstream of said cache, wherein said test interval ends when the last request of said plurality of requests exits said FIFO;
at the end of said test interval, setting any of said plurality of bits having said first value to said second value; and
identifying which of said plurality of cache lines area candidates to be written to, wherein said candidates comprise cache lines associated with said plurality of bits having said second value.

6. A method for detecting unused cache lines, said method comprising:
setting a first bit to a binary first value, wherein said first bit is associated with a cache line in a cache comprising a plurality of cache lines, and wherein said cache is coupled to an output of a first-in first-out buffer (FIFO) that has a number of stages for queuing packets; and
setting said first bit to a binary second value if said cache line is referenced during a test interval, wherein said binary second value indicates said cache line cannot be written to, and wherein if said first bit has said binary first value then said cache line is a candidate to be written to.

7. The method of claim 6 further comprising:
designating a particular packet as a probe;
inserting said probe into said FIFO, wherein said first bit is set to said binary first value concurrent with said inserting; and
checking a value of said first bit when said probe exits said FIFO.

8. The method of claim 6 further comprising:
receiving a first request comprising a reference to said cache line;
in response to said first request, setting said first bit to said binary first value and setting a second bit associated with said cache line to a third binary value; and
setting said first bit to said binary second value if a second request comprising said reference is received while said second bit is set to said third binary value.

9. The method of claim 6 further comprising:
receiving a plurality of requests comprising references to a plurality of cache lines, wherein said test interval begins when the first request of said plurality of requests is received and wherein a plurality of bits is associated with each of said cache lines;
in response to each of said requests, setting a respective said plurality of bits to a first value;
passing said plurality of requests through a first-in first-out buffer (FIFO) that is coupled upstream of said cache, wherein said test interval ends when the last request of said plurality of requests exits said FIFO;
at the end of said test interval, setting any of said plurality of bits having said first value to a second value; and
identifying which of said plurality of cache lines are candidates to be written to, wherein said candidates comprise cache lines associated with said plurality of bits having said second value.

10. The method of claim 6 further comprising:
allocating to said cache line a new address tag that replaces an existing address tag associated with said cache line; and
setting said first bit to said binary second value in response to said allocating.

11. The method of claim 6 wherein said first bit is associated with a plurality of cache lines in said cache, wherein if any of said cache lines in said plurality of cache lines is referenced during said test interval, then said first bit is set to said binary second value and none of said cache lines in said plurality is a candidate to be written to.

12. The method of claim 6 wherein said cache comprises a plurality of cache lines, wherein said method further comprises:
setting a plurality of bits associated with said plurality of cache lines to said binary first value, wherein each of said cache lines is associated with a respective one of said bits;
if a cache line in said plurality of cache lines is referenced during said test interval, setting a value of a respective bit in said plurality of bits to said binary second value; and
identifying which of said cache lines are candidates to be written to, based on values of said plurality of bits after said test interval ends.

13. A system for detecting unused cache lines, said system comprising:
a memory;
a cache coupled to said memory and comprising a plurality of cache lines;
a memory interface coupled to said memory and operable for comparing a first address tag in a request for data to address tags in said cache; and
a first-in first-out buffer (FIFO) coupled between said memory interface and said cache and comprising a number of stages operable for queuing packets; wherein, if said first address tag is not associated with any of said cache lines, then data corresponding to said first address tag is written from said memory to a cache line selected from cache lines that are candidates to be written to, and wherein said candidates comprise cache lines in said cache that are not referenced during a test interval, wherein a plurality of bits associated with said candidates each have a first value at the beginning of said test interval and remain set to said first value at the end of said test interval, and wherein said test interval corresponds in length to an amount of latency between said memory interface and said cache.

14. The system of claim 13 wherein each of said cache lines is associated with a respective one of said bits;
wherein said memory interface is further operable for setting a value of a respective bit in said plurality of bits if a cache line in said plurality of cache lines is referenced during said test interval, wherein values of said plurality of bits after said test interval ends are used to identify said candidates.

15. The system of claim 13 wherein said FIFO receives a particular packet that is identified as a probe, wherein said test interval begins when said probe enters said FIFO and ends when said probe exits said FIFO;

wherein said memory interface is further operable for setting said plurality of bits associated with said cache lines to said first value concurrent with said probe entering said FIFO, wherein each of said cache lines is associated with a respective one of said bits; said memory interface further operable for setting a value of a respective bit in said plurality of bits to a second value if a cache line is referenced during said test interval and for identifying which of said cache lines are candidates to be written to based on values of said plurality of bits when said test interval ends, wherein said candidates comprise cache lines associated with bits having said first value.

16. The system of claim 13 further comprising a counter coupled to said memory interface, wherein said test interval begins when said counter starts counting and ends when said counting reaches a specified number;

wherein said memory interface is further operable for setting said plurality of bits associated with said cache lines to said first value concurrent with said counter starting said count, wherein each of said cache lines is associated with a respective one of said bits; said memory interface further operable for setting a value of a respective bit in said plurality of bits to a second value if a cache line is referenced during said test interval and for identifying which said cache lines comprise said candidates based on values of said plurality of bits when said test interval ends, wherein said candidates comprise cache lines associated with bits having said first value.

17. The system of claim 13 wherein said first address tag indexes a cache line in said cache, wherein said test interval begins when said request enters said FIFO and ends when said request exits said FIFO;

wherein said memory interface is further operable for setting a first bit associated with said cache line to a binary first value and setting a second bit associated with said cache line to a binary second value, wherein said second bit is set to a binary third value when said test interval ends; said memory interface further operable for setting said first bit to a binary fourth value if a second request comprising said address tag for said cache line is received while said second bit is set to said second value, wherein if said first bit has said fourth value when said test interval ends then said cache line is not a candidate to be written to.

18. The system of claim 13 wherein said memory interface is further operable for allocating to said cache line a second address tag that replaces said first address tag and for changing a bit associated with said cache line from said first value to a second value in response to said allocating, wherein if said bit has said second value then said cache line is not a candidate to be written to.

\* \* \* \* \*